United States Patent
Shimizu

(10) Patent No.: US 8,157,543 B2
(45) Date of Patent: Apr. 17, 2012

(54) HIGH-SPEED ROTATING SHAFT OF SUPERCHARGER

(75) Inventor: Masahiro Shimizu, Tokyo (JP)

(73) Assignee: IHI Corporation, Tokyo (JP)

( * ) Notice: Subject to any disclaimer, the term of this patent is extended or adjusted under 35 U.S.C. 154(b) by 885 days.

(21) Appl. No.: 12/280,816

(22) PCT Filed: Jan. 31, 2007

(86) PCT No.: PCT/JP2007/051607
§ 371 (c)(1),
(2), (4) Date: Aug. 27, 2008

(87) PCT Pub. No.: WO2007/108234
PCT Pub. Date: Sep. 27, 2007

(65) Prior Publication Data
US 2009/0056332 A1    Mar. 5, 2009

(30) Foreign Application Priority Data
Mar. 23, 2006 (JP) .................................. 080527/2006

(51) Int. Cl.
*F04B 17/00* (2006.01)
*F04B 35/00* (2006.01)
*F16C 3/00* (2006.01)
*F16C 3/03* (2006.01)

(52) U.S. Cl. ......... 417/407; 464/180; 464/183; 464/162

(58) Field of Classification Search .................. 417/407; 464/180, 182, 183, 162, 142; 60/605.3
See application file for complete search history.

(56) References Cited

U.S. PATENT DOCUMENTS

| | | | | |
|---|---|---|---|---|
| 2,588,459 A | * | 3/1952 | Annen | 384/491 |
| 2,918,207 A | * | 12/1959 | Moore | 417/407 |
| 3,612,628 A | * | 10/1971 | Steele | 417/407 |
| 3,632,222 A | * | 1/1972 | Cronstedt | 415/119 |
| 3,675,056 A | | 7/1972 | Lenz | |
| 3,728,857 A | * | 4/1973 | Nichols | 417/407 |
| 3,742,123 A | | 6/1973 | Haub, Jr. | |
| 3,778,194 A | | 12/1973 | Miller et al. | |
| 3,811,741 A | * | 5/1974 | McInerney et al. | 417/407 |
| 3,890,780 A | * | 6/1975 | Hagemeister et al. | 417/407 |
| 3,927,530 A | | 12/1975 | Braun | |

(Continued)

FOREIGN PATENT DOCUMENTS

CA    2068369    11/1992

(Continued)

OTHER PUBLICATIONS

Office Action issued in co-pending U.S. Appl. No. 12/300,726, dated Dec. 21, 2010.

(Continued)

*Primary Examiner* — Thai Ba Trieu
(74) *Attorney, Agent, or Firm* — Griffin & Szipl, P.C.

(57) ABSTRACT

In a high-speed rotating shaft (10) of a supercharger which is rotatably supported by two radial bearings (12*a*, 12*b*) spaced at a fixed distance (L), directly couples a turbine impeller fixed to one end and a compressor impeller fixed to the other end, and transmits a rotational driving force of the turbine impeller to the compressor impeller, a small shaft portion (14) having a smaller diameter than a bearing portion is provided between bearings. The small shaft portion (14) is offset to a compressor side.

2 Claims, 4 Drawing Sheets

U.S. PATENT DOCUMENTS

| | | | |
|---|---|---|---|
| 3,961,867 A | | 6/1976 | Woollenweber |
| 4,061,279 A | * | 12/1977 | Sautter .................... 464/180 |
| 4,198,063 A | | 4/1980 | Shimizu et al. |
| 4,253,031 A | | 2/1981 | Frister |
| 4,301,375 A | | 11/1981 | Anderson |
| 4,641,977 A | | 2/1987 | Woollenweber |
| 4,704,075 A | | 11/1987 | Johnston et al. |
| 4,745,755 A | | 5/1988 | Kawamura |
| 4,757,686 A | | 7/1988 | Kawamura et al. |
| 4,833,887 A | | 5/1989 | Kawamura et al. |
| 4,872,817 A | * | 10/1989 | De Kruif .................... 417/407 |
| 4,883,370 A | * | 11/1989 | Nakanishi .................. 384/490 |
| 5,121,605 A | | 6/1992 | Oda et al. |
| 5,243,880 A | * | 9/1993 | Beier et al. .................... 464/180 |
| 5,323,613 A | | 6/1994 | Akiyama |
| 5,587,332 A | | 12/1996 | Chang et al. |
| 5,605,045 A | | 2/1997 | Halimi et al. |
| 5,798,587 A | | 8/1998 | Lee |
| 5,834,117 A | | 11/1998 | Onishi |
| 5,857,332 A | | 1/1999 | Johnston et al. |
| 5,870,894 A | | 2/1999 | Woollenweber et al. |
| 5,904,471 A | | 5/1999 | Woollenweber et al. |
| 5,906,098 A | | 5/1999 | Woollenweber et al. |
| 6,032,466 A | | 3/2000 | Woollenweber et al. |
| 6,102,672 A | | 8/2000 | Woollenweber et al. |
| 6,129,524 A | | 10/2000 | Woollenweber et al. |
| 6,145,314 A | | 11/2000 | Woollenweber et al. |
| 6,160,332 A | | 12/2000 | Tsuruhara |
| 6,218,747 B1 | | 4/2001 | Tsuruhara |
| 6,253,747 B1 | * | 7/2001 | Sell et al. .................... 123/559.1 |
| 6,257,834 B1 | | 7/2001 | Bremer et al. |
| 6,278,199 B1 | | 8/2001 | Grant et al. |
| 6,293,769 B1 | | 9/2001 | Radermacher et al. |
| 6,416,281 B1 | | 7/2002 | Bremer et al. |
| 6,449,950 B1 | | 9/2002 | Allen et al. |
| 6,609,375 B2 | | 8/2003 | Allen et al. |
| 6,647,724 B1 | | 11/2003 | Arnold et al. |
| 6,668,553 B1 | | 12/2003 | Ghizawi |
| 6,753,628 B1 | | 6/2004 | Neal .................... 310/43 |
| 6,768,332 B2 | | 7/2004 | Lin et al. |
| 6,845,617 B1 | | 1/2005 | Allen et al. |
| 6,871,499 B1 | | 3/2005 | Allen et al. |
| 6,986,648 B2 | | 1/2006 | Williams et al. |
| 7,008,194 B2 | | 3/2006 | Frankenstein |
| 7,010,916 B2 | | 3/2006 | Sumser et al. |
| 7,056,103 B2 | | 6/2006 | LaRue |
| 7,352,077 B2 | | 4/2008 | Shibui et al. |
| 7,360,361 B2 | | 4/2008 | Prusinski et al. |
| 7,458,214 B2 | | 12/2008 | Philippe |
| 7,670,056 B2 | * | 3/2010 | Petitjean et al. .............. 384/284 |
| 7,753,591 B2 | * | 7/2010 | Petitjean et al. .............. 417/407 |
| 7,765,846 B2 | * | 8/2010 | Stueckrad et al. ............ 464/183 |
| 2003/0017879 A1 | * | 1/2003 | Tsay et al. .................... 464/180 |
| 2003/0051475 A1 | | 3/2003 | Allen et al. |
| 2003/0118461 A1 | | 6/2003 | Hodapp et al. |
| 2004/0229703 A1 | * | 11/2004 | Jackson et al. ................ 464/162 |
| 2005/0082941 A1 | | 4/2005 | Iida et al. |
| 2006/0081226 A1 | | 4/2006 | Bolz |
| 2006/0123783 A1 | | 6/2006 | Philippe |
| 2006/0225419 A1 | | 10/2006 | Prusinski et al. |
| 2006/0245913 A1 | | 11/2006 | Thiele et al. |
| 2007/0036664 A1 | | 2/2007 | Shibui et al. |
| 2007/0108772 A1 | | 5/2007 | Shibui et al. .................... 290/52 |
| 2008/0087018 A1 | | 4/2008 | Woollenweber |
| 2009/0025386 A1 | | 1/2009 | Rumsby |
| 2010/0132358 A1 | * | 6/2010 | Purdey et al. ................ 60/605.3 |
| 2010/0175377 A1 | | 7/2010 | Hippen et al. |
| 2010/0266430 A1 | | 10/2010 | Shimizu |
| 2011/0124421 A1 | * | 5/2011 | Kienhofer et al. ............ 464/183 |

FOREIGN PATENT DOCUMENTS

| | | |
|---|---|---|
| CH | 266731 | 2/1950 |
| CN | 2605696 Y | 3/2004 |
| DE | 4115273 | 6/1992 |
| DE | 10156704 | 5/2003 |
| DE | 10022113 | 11/2005 |
| DE | 10 2005 052 363 | 5/2007 |
| EP | 0079100 | 5/1983 |
| EP | 0212988 | 3/1987 |
| EP | 0304259 | 2/1989 |
| EP | 1348848 | 10/2003 |
| FR | 2859499 | 3/2005 |
| GB | 2021874 | 12/1979 |
| GB | 2162377 | 1/1986 |
| JP | 58-124024 | 7/1983 |
| JP | 60-153826 | 10/1985 |
| JP | 61-49126 | 4/1986 |
| JP | 61-237830 A | 10/1986 |
| JP | 01-019122 | 1/1989 |
| JP | 01-171006 | 7/1989 |
| JP | 02-099722 | 4/1990 |
| JP | 03-138430 | 6/1991 |
| JP | 4-119624 | 10/1992 |
| JP | H05026202 | 4/1993 |
| JP | 05199708 | 8/1993 |
| JP | 06-042361 | 2/1994 |
| JP | 06-288242 | 10/1994 |
| JP | 06-346748 | 12/1994 |
| JP | 07-102988 | 4/1995 |
| JP | 10-299500 | 11/1998 |
| JP | 11-182259 | 7/1999 |
| JP | 2000-110557 | 4/2000 |
| JP | 2000-130176 | 5/2000 |
| JP | 2000-145468 | 5/2000 |
| JP | 2000145468 A | 5/2000 |
| JP | 2000-514987 | 11/2000 |
| JP | 2001-295655 | 10/2001 |
| JP | 2001-527613 | 12/2001 |
| JP | 3389748 | 3/2003 |
| JP | 2003-232340 | 8/2003 |
| JP | 2003232340 A | 8/2003 |
| JP | 2003-293785 | 10/2003 |
| JP | 2004-003420 | 1/2004 |
| JP | 2004-044451 | 2/2004 |
| JP | 2004-044452 | 2/2004 |
| JP | 2004-144094 | 5/2004 |
| JP | 10 2004 0089337 | 10/2004 |
| JP | 2005-023920 | 1/2005 |
| JP | 2005-069178 | 3/2005 |
| JP | 2005-120927 | 5/2005 |
| JP | 2005-207337 | 8/2005 |
| JP | 2005207337 A | 8/2005 |
| JP | 2005-248799 | 9/2005 |
| JP | 2005248799 A | 9/2005 |
| JP | 2006-002568 | 1/2006 |
| JP | 2006-514526 | 4/2006 |
| JP | 2007-297973 A | 11/2007 |
| JP | 2007-309101 | 11/2007 |
| JP | 2007-321698 A | 12/2007 |
| JP | 2007-321699 A | 12/2007 |
| JP | 2008-029166 | 2/2008 |
| JP | 2008-31949 A | 2/2008 |
| JP | 2009-243361 A | 10/2009 |
| JP | 2009-243365 A | 10/2009 |
| JP | 2010-121589 A | 6/2010 |
| KR | 10 2004 0105849 A | 12/2004 |
| WO | 84/04136 | 10/1984 |
| WO | 98-02652 | 1/1998 |
| WO | 98/30790 | 7/1998 |
| WO | 2005/024202 A1 | 3/2005 |
| WO | 2005/028876 A1 | 3/2005 |
| WO | 2005/113961 A1 | 12/2005 |

OTHER PUBLICATIONS

Office Action issued in co-pending U.S. Appl. No. 12/300,746, dated Dec. 22, 2010.

First Office Action, issued in corresponding Chinese Patent Application No. 200780020456.2, issued Nov. 20, 2009.

Office Action issued in Japanese Patent Application No. 2006-207973, of co-pending U.S. Appl. No. 12/864,837, dated Jan. 11, 2011 with an english translation.

http://answers.yahoo.com/question/index?qid=20100220052035A, dated Feb. 20, 2010, downloaded Mar. 9, 2011, 1 page.

http://www.answers.com/topic/friction-fit, downloaded Mar. 9, 2011, 1 page.

http://www.roymech.co.uk/Useful_Tables/ISO_Tolerances/ISO, downloaded Mar. 9, 2011, 2 pgs.

http://encyclopedia2.thefreedictionary.com/friction+fit, downloaded Mar. 9, 2011, 2 pgs.

Microfilm of the specification and drawings annexed to the request of Japanese Utility Model Application No. 134167/1984 (Laid-open No. 49126/1986), dated Apr. 2, 1986.

Office Action issued Feb. 22, 2010 in co-pending U.S. Appl. No. 11/617,211.

Office Action issued in related Korean Patent Application No. 10-2007-0005555 (included herein in Korean and Japanese) dated Mar. 30, 2009.

Office Action issued in Korean Patent Application No. 10-2008-7028778, dated Feb. 28, 2011, of co-pending U.S. Appl. No. 12/300,726 and its english translation.

Office Action issued in co-pending U.S. Appl. No. 12/300,726, dated May 2, 2011.

Notice of Allowance issued in co-pending U.S. Appl. No. 12/300,746, dated Apr. 19, 2011.

Chinese Office Action issued in co-pending U.S. Appl. No. 12/377,987. Chinese Patent Application No. 200780030544.0. mailed Mar. 8, 2010.

Microfilm of the specification and drawings annexed to the request of Japanese Utility Model Application No. 10710/1983 (Laid-Open No. 116537/1984), Toyota Motor Corp, Aug. 6, 1984.

Microfilm of the specification and drawings annexed to the request of Japanese Utility Model Application No. 142414/1985 (Laid-Open No. 49629/1987), Nissan Motor Corp, Mar. 27, 1987.

Microfilm of the specification and drawings annexed to the request of Japanese Utility Model Application No. 115203/1986 (Laid-Open No. 22301/1988), Nissan Motor Corp, Feb. 15, 1988.

International Search Report issued in corresponding application No. PCT/JP2007/051607, completed Feb. 15, 2007 and mailed Feb. 27, 2007.

Office Action mailed Jul. 7, 2011 in co-pending U.S. Appl. No. 12/377,977.

Office Action mailed Jul. 12, 2011 in co-pending U.S. Appl. No. 12/377,987.

Patent Abstracts of Japan English Abstract corresponding to the Hattori Document JP61-237830, a filed in a related application as "Exhibit A".

Espacenet English Abstract corresponding to the Hwang Document KR20040089337, filed in a related application as "Exhibit B".

Machine English Translation of the Hwang Document KR20040089337, obtained from the Korean Patent Office, filed in a related application as "Exhibit C,".

Machine translation of JP2000-145468, Published on May 26, 2000.

Office Action dated Oct. 11, 2011 in corresponding Korean Patent Application No. 10-2009-7002938.

Office Action dated Oct. 11, 2011 in corresponding Korean Patent Application No. 10-2009-7002939.

Office Action dated Nov. 1, 2011 in corresponding Japanese Patent Application No. 10-2008-7021399.

* cited by examiner

Fig. 2A
PRIOR ART
Fig. 2B
PRIOR ART
Fig. 2C
PRIOR ART
Fig. 3
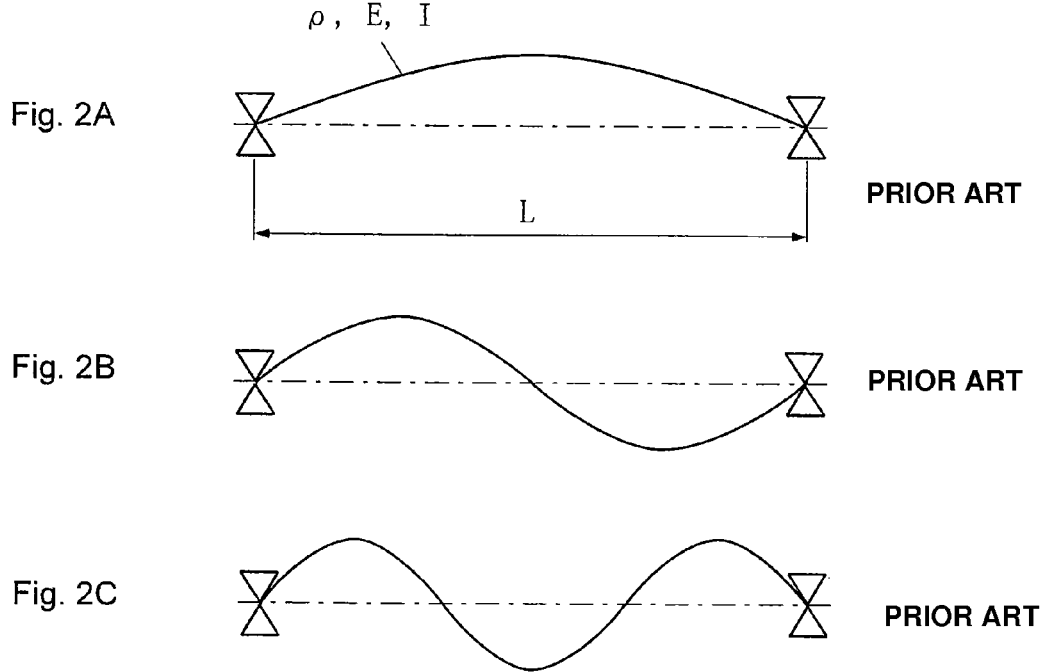
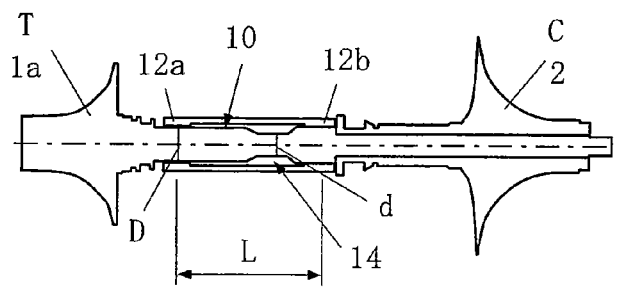

HIGH-SPEED ROTATING SHAFT OF SUPERCHARGER

This is a National Phase Application in the United States of International Patent Application No. PCT/JP2007/051607 filed Jan. 31, 2007, which claims priority on Japanese Patent Application No. 080527/2006, filed Mar. 23, 2006. The entire disclosures of the above patent applications are hereby incorporated by reference.

BACKGROUND OF THE INVENTION

1. Field of the Invention

The present invention relates to a high-speed rotating shaft of a supercharger.

2. Description of Related Art

Previously compressing an air or an air-fuel mixture supplied to a cylinder of an internal combustion engine is called as a supercharging, and a compressor thereof is called as a supercharger. Further, a supercharger executing the supercharging by utilizing an exhaust gas of the engine is called as an exhaust gas turbine supercharger or a turbocharger for short. In the following description, in the present application, the turbocharger is simply called as "supercharger" except a particularly necessary case.

FIG. 1 is a general structure view showing an example of a conventional turbocharger. In this drawing, the turbocharger is constituted by a turbine rotor shaft 1, a compressor impeller 2, a bearing housing 3, a turbine housing 4, a compressor housing 5a, a seal plate 5b and the like.

The bearing housing 3, the turbine housing 4, the compressor housing 5a and the seal plate 5b are coupled to each other in an illustrated order. Further, the turbine rotor shaft 1 is formed by integrating a turbine impeller 1a and a rotor shaft 1b in accordance with a welding or the like, is rotationally supported by a radial bearing within the bearing housing 3, and is coaxially coupled to the compressor impeller 2.

In accordance with this structure, it is possible to widely improve a performance of the internal combustion engine by rotationally driving the turbine impeller 1a by the exhaust gas of the internal combustion engine, transmitting a rotating force to the compressor impeller 2 via the rotor shaft 1b so as to rotationally drive the compressor impeller 2, and compressing the air (or the air-fuel mixture) so as to supply to the internal combustion engine.

In FIG. 1, the rotation of the turbine impeller 1a is supported in a radial direction by two floating metals 6a and 6b, and is supported in a thrust direction by a turbine side thrust bearing 8a and a compressor side thrust bearing 8b via a thrust collar 7. In this case, in this drawing, reference numeral 9 denotes an oil thrower, and reference symbol 6c denotes a bearing spacer.

In accordance with a high performance of the supercharger, the turbine rotor shaft 1 and the compressor impeller 2 are rotated at a high speed between several tens of thousand and several hundreds of thousand min-1. The floating metals 6a and 6b rotate at lower speed than the turbine rotor shaft because these metals are not fixed with the shaft, and the thrust collar 7 rotate at the same speed as that of the turbine rotor shaft because it is fixed with the shaft. Therefore the floating metals 6a and 6b and the thrust collar 7 support the radial force and the thrust force respectively while rotating with respective high speed. Further, in order to reduce a sliding resistance at a time of rotating, the structure is made such that a lubricating oil is always supplied to the sliding portion from an oil path 3a provided in the bearing housing 3.

Further, as a bearing structure of the turbine rotor shaft rotating at a high speed, patent documents 1 to 3 have been already disclosed.

Patent Document 1: Japanese Unexamined Patent Publication No. 2000-110577 "bearing apparatus of supercharger"
Patent Document 2: Japanese Unexamined Patent Publication No. 2001-295655 "bearing apparatus of supercharger"
Patent Document 3: Japanese Unexamined Patent Publication No. 2005-23920 "bearing apparatus of supercharger"

As mentioned above, the high-speed rotating shaft (the turbine rotor shaft) of the conventional supercharger is normally supported by two radial bearings spaced at a fixed distance. In this case, a specific frequency $\omega$ of the high-speed rotating shaft can be expressed by an approximate expression (1) in the case of the high-speed rotating shaft except the turbine and the compressor in both ends.

$$\omega = (\pi/2) \times (n/L)^2 \times (EI/\rho A)^{0.5} \quad (1)$$

In this case, reference symbol n(=1, 2, 3, . . .) denotes a vibration mode degree (primary, secondary and tertiary) of a both-end support shaft shown in FIGS. 2A to 2C, reference symbol L denotes a bearing center distance, reference symbol E denotes a longitudinal elastic modulus, reference symbol I denotes a moment of inertia of the cross section of the high-speed rotating shaft, reference symbol $\rho$ denotes a density, and reference symbol A denotes a cross sectional area.

Further, if a diameter of the high-speed rotating shaft is set to d, an expression (2) can be obtained from the expression (1) on the basis of $I=\pi d^4/64$, $A=\pi d^2/4$, and $(I/A)^{0.5}=d/4$.

$$\omega = (\pi/2) \times (n/L)^2 \times (d/4) \times (E/\rho)^{0.5} \quad (2)$$

In this case, each of the expressions mentioned above corresponds to the approximate expression, and it is practically necessary to determine a critical speed in accordance with a strict computer simulation or the like including the turbine and the compressor in both ends.

Hereinafter, the rotating speed corresponding to the primary, secondary and tertiary vibration modes is called as "critical speed of bending" or simply called as "critical speed", in the present invention.

The high-speed rotating shaft of the conventional supercharger is designed such that the secondary critical speed of the shaft is sufficiently away from the rated speed which means maximum design speed. In such design, the primary critical speed becomes higher. Therefore when the rotating speed of the shaft passes through the primary critical speed, excitation energy applied to the supercharger becomes bigger and vibration and noise becomes larger.

Further, as shown in the drawing of the patent document 1, in order to improve a rotational stability of the supercharger, it is possible to decrease the primary critical speed of the high-speed rotating shaft by narrowing a distance between the bearings. Accordingly, for example, in the case that the rotating speed of the high-speed rotating shaft passes through the primary critical speed during the operation of the supercharger from a low-speed rotation to a high-speed rotation, there has been executed a reduction of a vibration and a noise by reducing an excitation energy applied to the supercharger.

However, as is apparent from the expression (2), it is generally possible to decrease the primary critical speed by narrowing a shaft diameter between the bearings, however, the secondary critical speed tends to be simultaneously decreased. Accordingly, there is a problem that the secondary critical speed is lowered largely in some shaft system so as to come close to the operation range and the shaft system becomes unstable.

SUMMARY OF THE INVENTION

The present invention is made for the purpose of simultaneously solving the problems mentioned above. In other words, an object of the present invention is to provide a high-speed rotating shaft of a supercharger which can decrease a primary critical speed while suppressing a decreasing of a secondary critical speed, with respect to a rated speed.

In accordance with the present invention, there is provided a high-speed rotating shaft of a supercharger which is rotatably supported by two radial bearings spaced at a fixed distance, directly couples a turbine impeller fixed to one end and a compressor impeller fixed to the other end, and transmits a rotational driving force of the turbine impeller to the compressor impeller, wherein a small shaft portion having a smaller diameter than a bearing portion is provided in an intermediate portion of the bearing, and the small shaft portion is offset in such a manner that a center of a distance between a starting point of the small shaft portion close to the turbine side and an end point close to the compressor side comes close to the compressor side with respect to a center between a distance between the two radial bearings.

In accordance with a preferable aspect of the present invention, an offset amount, a diameter and a length of the small shaft portion are set in accordance with a computer simulation in such a manner as to decrease a primary critical speed while suppressing a decreasing of a secondary critical speed with respect to a rated speed.

In accordance with the structure of the present invention, since the small shaft portion having the smaller diameter than the bearing portion is provided between the bearings of the high-speed rotating shaft, it is possible to decrease the primary critical speed of bending of the high-speed rotating shaft. Accordingly, in the case that the rotating speed of the high-speed rotating shaft passes through the primary critical speed during the operation of the supercharger, it is possible to reduce the vibration and the noise thereof.

Further, since the shaft diameter of the turbine side portion corresponding to a body portion of the secondary vibration mode of bending of the high-speed rotating shaft has approximately the same diameter as the bearing portion by offsetting the small shaft portion to the compressor side, a rigidity of the shaft positioned in the body portion of the secondary vibration mode of bending is not lowered. Therefore, it is possible to increase a stability of the shaft system and improve a reliability by suppressing the decreasing of the secondary critical speed of bending in such a manner that at least a decreasing amount of the secondary critical speed becomes smaller than a decreasing amount of the primary critical speed.

BRIEF DESCRIPTION OF THE DRAWINGS

FIG. 2A is a view showing a primary vibration mode of a both-end support shaft;

FIG. 2B is a view showing a secondary vibration mode of the both-end support shaft;

FIG. 2C is a view showing a tertiary vibration mode of the both-end support shaft;

FIG. 3 is a general structure view of a high-speed rotating shaft in accordance with the present invention;

DESCRIPTION OF THE PREFERRED EMBODIMENTS

Figure 1:
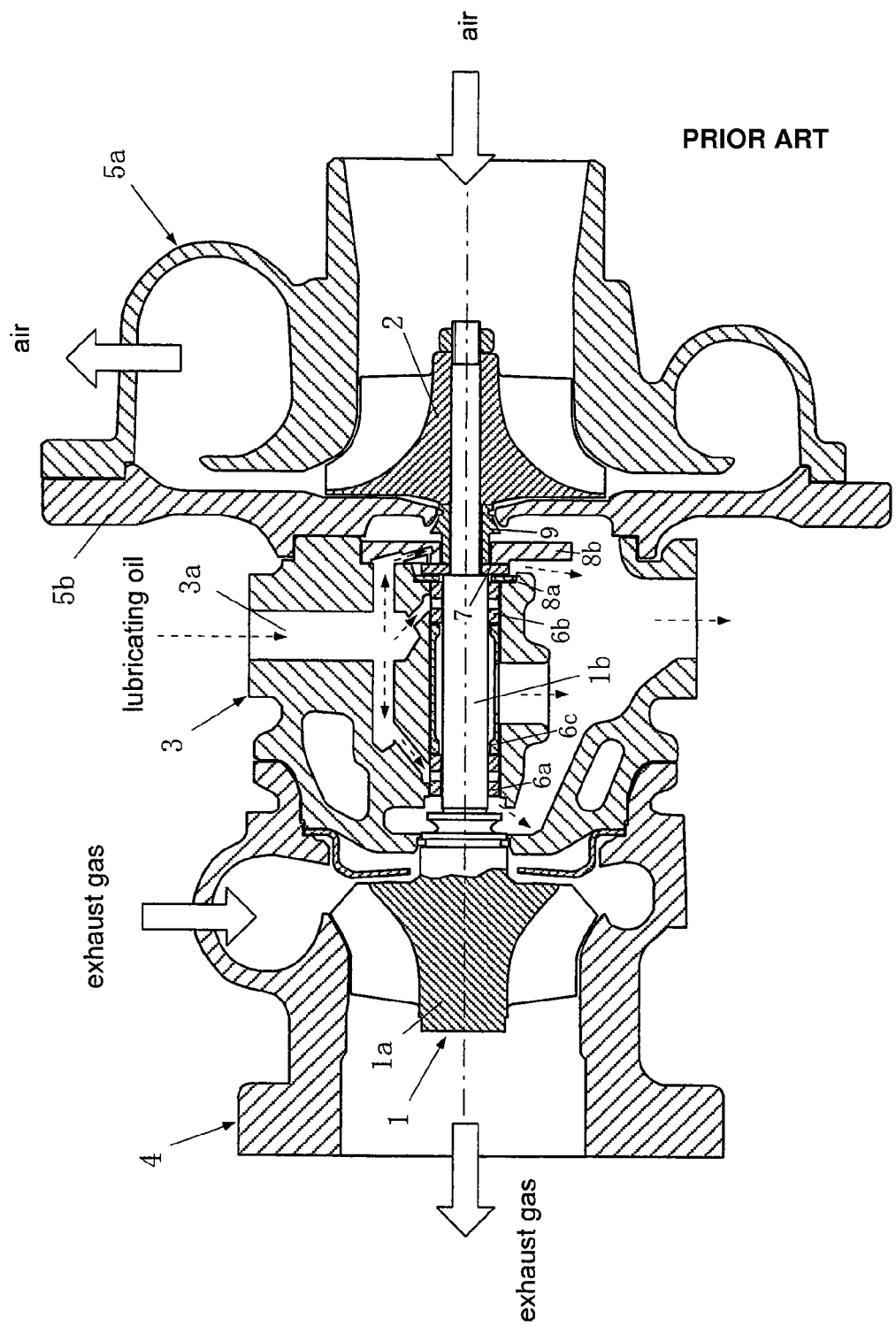
FIG. 1 is a general structure view showing an example of a conventional turbocharger.

A description will be given below of a preferable embodiment in accordance with the present invention with reference to the accompanying drawings. In this case, the same reference numerals are attached to common portions in the respective drawings, and an overlapping description will be omitted.

FIG. 3 is a general structure view of a high-speed rotating shaft in accordance with the present invention. As shown in this drawing, a high-speed rotating shaft 10 in accordance with the present invention is rotatably supported by two radial bearings 12a and 12b spaced at a fixed distance L.

In this case, in this drawing, the radial bearings 12a and 12b correspond to an integrally coupled journal bearing, however, the present invention is not limited to this, but the radial bearings may be independently provided as shown in FIG. 1. Further, the radial bearings 12a and 12b may be constituted by a so-called floating bearing which can rotate with respect to a bearing housing, a semi-floating bearing which can move only in a radial direction without rotating, or a fixed bearing which is completely fixed. Further, these radial bearings 12a and 12b may be constituted by gas bearings or rolling bearings.

The high-speed rotating shaft 10 in accordance with the present invention is structured such that a turbine impeller 1a is fixed to one end (a left end in the drawing) thereof, a compressor impeller 2 is fixed to the other end, the turbine impeller 1a is directly coupled to the compressor impeller 2, and a rotational driving force of the turbine impeller 1a is transmitted to the compressor impeller 2.

The high-speed rotating shaft 10 in accordance with the present invention has a small shaft portion 14 having a diameter d smaller than a diameter D of the bearing portion between the bearings.

Figure 4A:
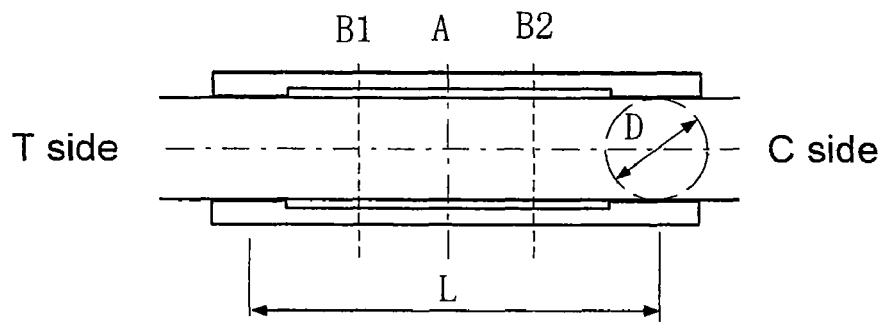
FIG. 4A is an explanatory view of the high-speed rotating shaft in FIG. 3 in the case that a small shaft portion is not provided.
Figure 4B:
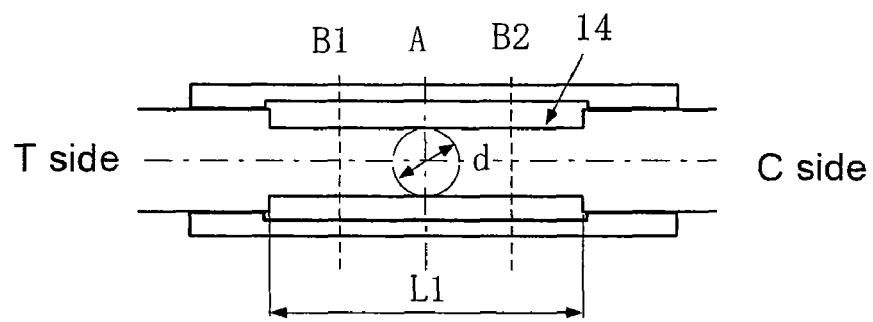
FIG. 4B is an explanatory view of the high-speed rotating shaft in FIG. 3 in the case that a small shaft length is maximum.
Figure 4C:
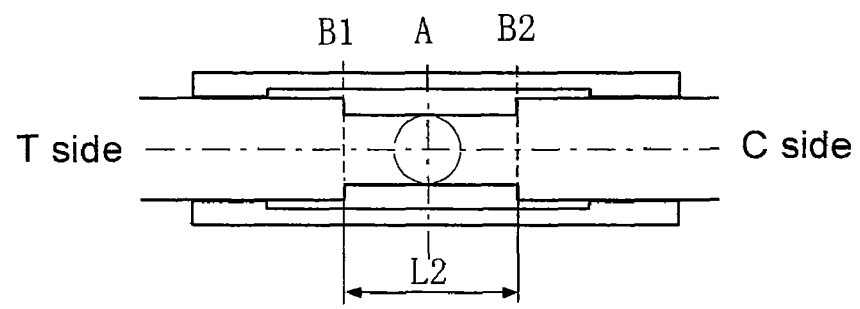
FIG. 4C is an explanatory view of the high-speed rotating shaft in FIG. 3 in the case that the small shaft length is medium.
Figure 4D:
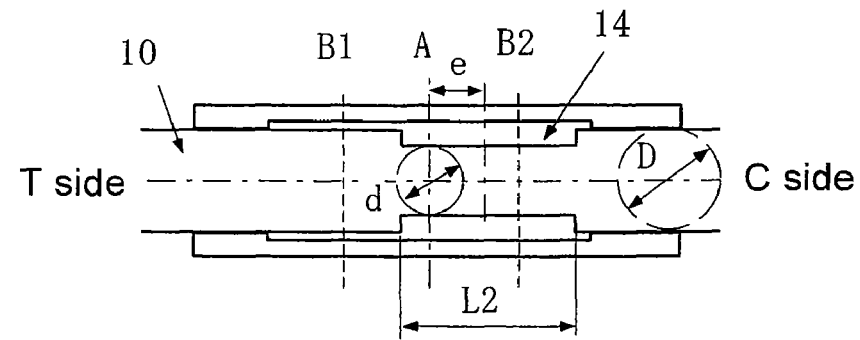
FIG. 4D is an explanatory view of the high-speed rotating shaft in FIG. 3 in the case that the small shaft length is medium.

FIGS. 4A to 4D are explanatory views of the high-speed rotating shaft 10 in FIG. 3. In the drawings, FIG. 4A shows a case that the small shaft portion 14 is not provided, FIG. 4B shows a case that a length (called as "small shaft length") of the small shaft portion 14 is maximum (L1), and FIGS. 4C and 4D show a case that the length of the small shaft portion 14 is middle length (L2: intermediate length between the case of no small shaft portion and the case of maximum of the small shaft portion).

In FIG. 4A, a one-dot chain line A is a center of the distance L between the radial bearings 12a and 12b and corresponds to a body portion (maximum vibrating portion) of a primary vibration mode of bending. Further two broken lines B1 and B2 indicate positions of ¼ and ¾ of the distance L between the radial bearings 12a and 12b, and correspond to a body portion of a secondary vibration mode of bending.

The high-speed rotating shaft 10 in accordance with the present invention corresponds to FIG. 4D, a small shaft portion 14 is offset at a distance e to the compressor side, and a turbine side portion corresponding to the body portion B1 (maximum vibrating portion) of the secondary vibration mode of bending has approximately the same diameter as the bearing portion. In other words, the small shaft portion 14 is offset in such a manner that a center of a distance between a starting point of the small shaft portion 14 in the turbine side and an end point in the compressor side comes close to the compressor side with respect to the center of the shaft distance between two radial bearings 12a and 12b.

FIG. 4C shows a comparative example, and is different from FIG. 4D in a point that the offset is not provided.

The offset amount e, the diameter d and the length L2 of the small shaft portion 14 can be freely set as far as the turbine side portion corresponding to the body portion B of the secondary vibration mode of bending can be held at approximately the same diameter as the bearing portion.

In this case, specifically, it is preferable to set the offset amount e, the diameter d and the length L2 in accordance with a computer simulation in such a manner that the primary critical speed is lowered with respect to a predetermined rated speed, and a decreasing amount (or rate) of the secondary critical speed does not exceed a decreasing amount (or rate) of the primary critical speed.

In accordance with the structure of the present invention mentioned above, since the small shaft portion 14 having the smaller diameter than the bearing portion is provided between the bearings, it is possible to reduce the vibration and the noise by decreasing the primary critical speed of bending.

Further, since the small shaft portion 14 is offset to the compressor side and the turbine side portion corresponding to the body portion B1 of the secondary vibration mode of bending has approximately the same diameter as the bearing portion, a rigidity of the shaft positioned in the body portion of the secondary vibration mode of bending is not lowered, so that it is possible to suppress the decreasing of the secondary critical speed of bending to the minimum so as to increase a stability of the shaft system and improve a reliability.

In this case, the turbine side portion corresponding to the body portion B1 of the secondary vibration mode of bending may be made bigger than the small shaft portion 14 and smaller than the bearing portion, within a range capable of suppressing the decreasing of the secondary critical speed of bending. Further, the portion may be made bigger than the small shaft portion 14 and the bearing portion.

Embodiment 1

Figure 5:
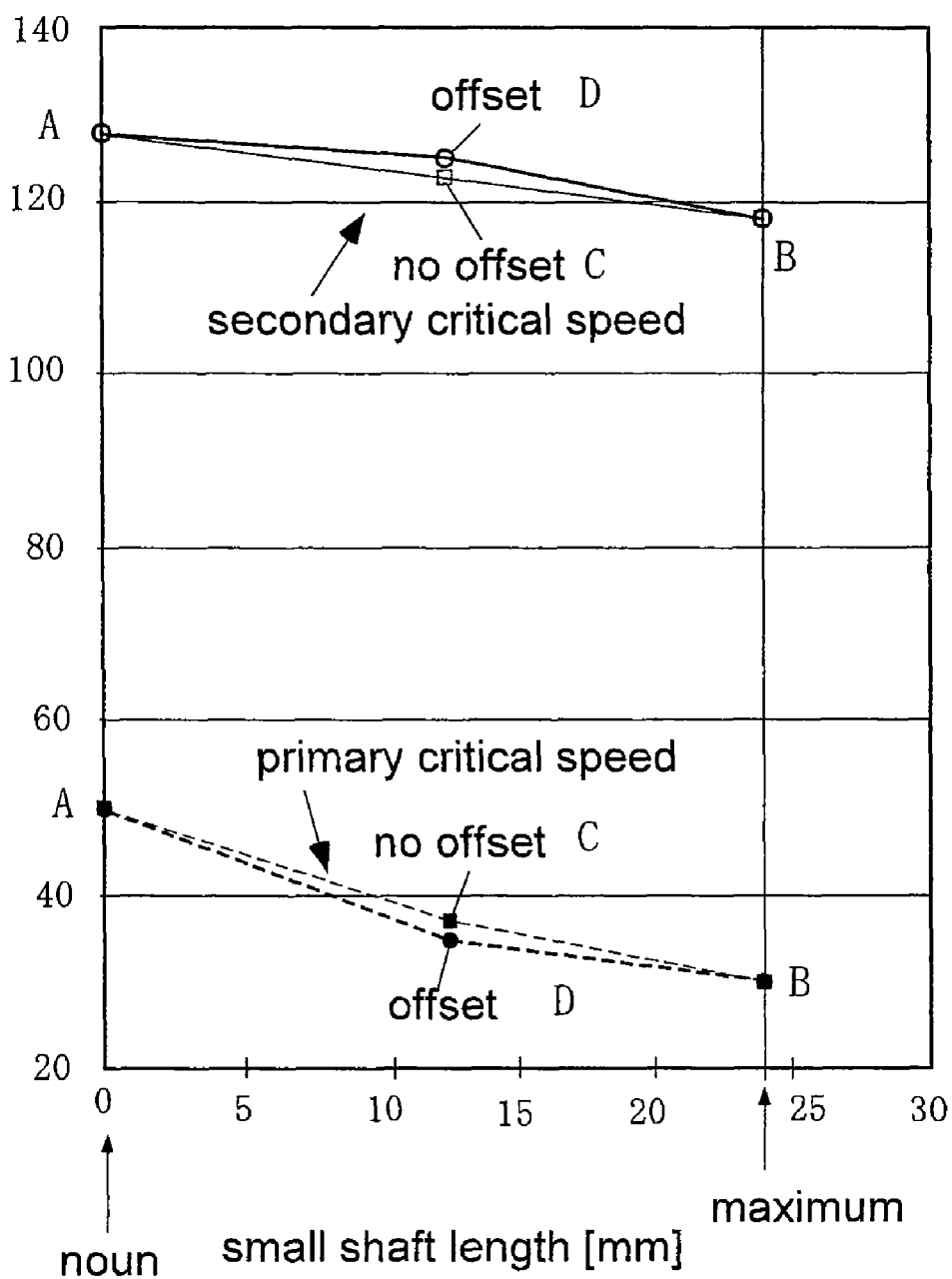
FIG. 5 is a view of a relation between a small shaft length and a critical speed of the high-speed rotating shaft in FIG. 3.

FIG. 5 is a view of a relation between the small shaft length and the critical speed of the high-speed rotating shaft in FIG. 3 obtained by the computer simulation. In this drawing, a horizontal axis indicates the length of the small shaft portion 14 (the small shaft length), and a vertical axis indicates a rate (%) with respect to a rated speed. Further, two broken lines in a lower side of the drawing indicate the primary critical speed, and two solid lines in an upper side indicate the secondary critical speed. Further, reference symbols A to D in the drawing correspond to FIGS. 4A to 4D.

From the drawing, there can be known that it is possible to decrease the primary critical speed, however, the secondary critical speed is decreased at the same time, in the case (B) that the small shaft length is maximum (L1), in comparison with the case (A) that the small shaft portion 14 is not provided, so that the secondary critical speed comes close to the rated speed, and the shaft system becomes unstable.

Further, in the case that the small shaft length is intermediate (L2), there can be known that the case (D) that the offset is provided has a lower rate (about 5%) of decreasing of the secondary critical speed than a rate (about 15%) of decreasing of the primary critical speed, in comparison with the case (C) that the offset is not provided, and it is possible to decrease the primary critical speed while suppressing the decreasing of the secondary critical speed.

In this case, this embodiment shows the case that the maximum (L1) of the small shaft length is about 24 mm, and the intermediate (L2) of the small shaft length is about 12 mm, however, the present invention is not limited to this, but it is preferable to set optimum offset amount e, diameter d and length L2 with respect to a predetermined rated speed in accordance with a computer simulation.

In this case, it goes without saying that the present invention is not limited to the embodiment mentioned above, but can be variously modified within the range of the scope of the present invention.

What is claimed is:

1. A high-speed rotating shaft arrangement for a supercharger, comprising:
    a shaft;
    a tubine impeller fixed to a first end of the shaft, and a compressor impeller fixed to a second end of the shaft,
    a first radial bearing disposed proximate the first end of the shaft and a second radial bearing spaced at a fixed distance from the first radial bearing, and disposed proximate a second end of the shaft,
    wherein the shaft further comprises:
    a) a reduced diameter portion and
    b) a bearing engaging portion, the reduced diameter portion having a diameter smaller than the bearing engaging portion and a mid point closer to the second radial bearing than the first radial bearing so that a reduced diameter portion is offset with respect to a mid point of the fixed distance by which first and second radial bearings are spaced.

2. The high-speed rotating shaft arrangement for a supercharger as claimed in claim 1, wherein selection of an offset amount, a diameter and a length of the reduced diameter shaft portion parameters comprises means for decreasing a primary critical speed with respect to a rated speed so that a decreasing amount per unit time, of a secondary critical speed does not exceed a decreasing amount per unit time, of the primary critical speed.

\* \* \* \* \*